United States Patent [19]
Kemper

[11] Patent Number: 5,683,773
[45] Date of Patent: Nov. 4, 1997

US005683773A

[54] CHLORINE-CONTAINING POLYETHYLENE- AND POLYETHER-BASED ELASTOMERS STABILIZED WITH BARIUM SULFATE

[75] Inventor: Dennis Kemper, Aurora, Colo.

[73] Assignee: The Gates Corporation, Denver, Colo.

[21] Appl. No.: 808,712

[22] Filed: Feb. 28, 1997

Related U.S. Application Data

[63] Continuation of Ser. No. 375,890, Jan. 20, 1995, abandoned.

[51] Int. Cl.$^6$ .................. B29D 23/18; C08K 3/30
[52] U.S. Cl. .......... 428/36.91; 428/500; 428/524; 524/423; 525/328.7; 525/331.7; 525/333.7; 525/334.1; 526/315; 526/348; 526/352
[58] Field of Search .................. 428/36.91, 500, 428/524; 524/423; 526/348, 352, 315; 525/328.7, 331.7, 333.7, 334.1

[56] References Cited

U.S. PATENT DOCUMENTS

| | | | |
|---|---|---|---|
| 4,110,510 | 8/1978 | Oliveira | 428/285 |
| 4,115,352 | 9/1978 | Bohen et al. | 260/45.75 B |
| 4,329,992 | 5/1982 | Becker et al. | 128/272 |
| 4,357,446 | 11/1982 | Matoba | 525/281 |
| 4,370,388 | 1/1983 | Mito et al. | 428/461 |
| 5,036,121 | 7/1991 | Coaker et al. | 524/100 |
| 5,194,470 | 3/1993 | Carette et al. | 524/178 |
| 5,280,083 | 1/1994 | Forste et al. | 525/369 |

OTHER PUBLICATIONS

Report No. 24001–6, Form No. 305–702–80: Dow Chlorinated Polyethylene Elastomers; Dow Chemical U.S.A., Designed Products Department, Midland, Michigan 48640.

*Primary Examiner*—W. Robinson H. Clark
*Attorney, Agent, or Firm*—C. H. Castleman, Jr.; H. W. Oberg; S. G. Austin

[57] ABSTRACT

Chlorine-containing polyethylene- and polyether-based elastomer compositions having excellent heat resistance and chemical resistance, which are heat stabilized with from about 1 to about 25 parts per hundred weight of the elastomer of barium sulfate, and high temperature and chemical resistant molded and extruded products including automotive hose and cable jacketing incorporating such elastomer compositions.

14 Claims, 1 Drawing Sheet

CHLORINE-CONTAINING POLYETHYLENE- AND POLYETHER-BASED ELASTOMERS STABILIZED WITH BARIUM SULFATE

This application is a continuation of application Ser. No. 08/375,890, filed Jan. 20, 1995, now abandoned.

BACKGROUND OF THE INVENTION

1. Field of the Invention

The present invention relates to heat stabilized chlorine-containing polyethylene- and polyether-based elastomer compositions having excellent heat resistance and chemical resistance, and more particularly to these chlorine-containing polyethylene- and polyether-based elastomer compositions which are heat stabilized with barium sulfate, and to high temperature and chemical resistant molded and extruded products including automotive hose and cable jacketing incorporating such elastomer compositions.

2. Description of the Prior Art

Chlorine-containing polyethylene- and-polyether-based elastomer compositions, including chlorinated polyethylene, chlorosulfonated polyethylene and epichlorohydrin elastomers, possess good mechanical properties, low compression set, good low temperature flexibility, and good dynamic fatigue resistance. These materials exhibit excellent aging, weathering, chemical and ozone resistance due to their saturated backbones, and the polarity contributed by the chlorine and ether components provide good oil swell resistance. This combination of properties makes these elastomers particularly well suited for applications including cable jacketing, automotive and industrial hose, molded goods and membranes.

Chlorine-containing polyethylene- and polyether-based elastomers require heat stabilization during curing or vulcanization to resist hydrochloric acid cleavage. Various heat stabilizers, including metal oxides such as magnesium oxide, lead compounds including dibasic lead-phthalate, lead-silicate and lead oxide, sulfur-containing organotin compounds, as well as epoxidized soybean oils and cycloaliphatic epoxy resins have been used for this purpose. Barium carbonate has been used to stabilize epichlorohydrin elastomers, but the resulting compounds exhibit inferior mechanical properties. Lead compounds typically provide the best aging resistance and until recently, were the most commonly used compounds for this purpose. Mixed metal salts such as barium-cadmium, barium-zinc, and calcium-zinc salts are also known heat stabilizers.

Many of the heat stabilizers commonly used present various problems due to their toxicity. Section 313 of the Emergency Planning and Community Right-to-Know Act of 1986 (42 U.S.C. 11023, "EPCRA"), for example, requires certain facilities manufacturing, processing or otherwise using listed toxic chemicals to report their environmental releases of such chemicals annually. Section 6607 of the Pollution Prevention Act (42 U.S.C. 13106, "PPA") requires facilities to report pollution prevention and recycling data for these chemicals, beginning in the 1991 reporting year. More than 300 chemicals and 20 chemical categories are listed in Section 313 of EPCRA. Toxicity concerns and increased reporting costs have resulted in a decrease in the use of lead, barium, and cadmium which leave calcium and magnesium as the most commonly used heat stabilizers. These materials however, are known to be moisture sensitive and cause water absorption and are therefore unsatisfactory.

Consequently, a need exists for improved heat stabilized chlorine-containing polyethylene- and polyether-based elastomer compositions which exhibit excellent heat resistance and chemical resistance, and which address toxicity concerns.

SUMMARY OF THE INVENTION

Accordingly, it is an object of the present invention to provide improved heat-stabilized chlorine-containing polyethylene- or polyether-based elastomer compositions which substantially avoid these toxicity concerns.

It is a further object of the present invention to provide an improved heat resistant, chemical resistant automotive hose incorporating as at least one elastomeric member, an improved heat-stabilized chlorine-containing polyethylene- or polyether-based elastomer composition.

To achieve the foregoing and other objects and in accordance with a purpose of the present invention as embodied and broadly described herein, an elastomeric composition for incorporation in an article subject to high temperature or chemical exposure is provided, comprising the reaction product of 100 parts of a chlorine-containing polyethylene- or polyether-based elastomer and from about 1 to about 25 parts per hundred weight of said elastomer (phr), of a barium sulfate stabilizer which serves as the heat stabilizer for the elastomer.

In another embodiment, the present invention provides an improved high temperature, chemical resistant hose, comprising an elastomeric inner tube, a reinforcement layer telescoped about and preferably adhered to the inner tube, and optionally, a cover telescoped about and preferably adhered to the reinforcement layer. The cover may comprise either a fabric or elastomeric material, or a first elastomeric layer covered by a fabric layer. According to this embodiment of the present invention, at least one elastomeric member of the hose, i.e., the inner tube or the cover portion, is formed of an elastomer comprising a chlorine-containing polyethylene- or polyether-based elastomer which has been stabilized with barium sulfate. The inner tube may be of a multiple-layer construction, wherein the layers are not made of the same material. In the preferred embodiment however, the entire inner tube comprises the chlorine-containing polyethylene- or polyether-based elastomer heat stabilized with barium sulfate of the present invention.

The improved barium sulfate heat stabilized chlorine-containing polyethylene- or polyether-based elastomer composition of the present invention may contain various compounding agents known in the art such as fillers, reinforcing agents, plasticizers, softeners, antioxidants and process aids, in amounts generally known in the art.

BRIEF DESCRIPTION OF THE DRAWING

The accompanying drawings which are incorporated in and form a part of the specification, illustrate preferred embodiments of the invention, and together with the description, serve to explain the principles of the invention.

DESCRIPTION OF THE PREFERRED EMBODIMENTS

Figure 1:
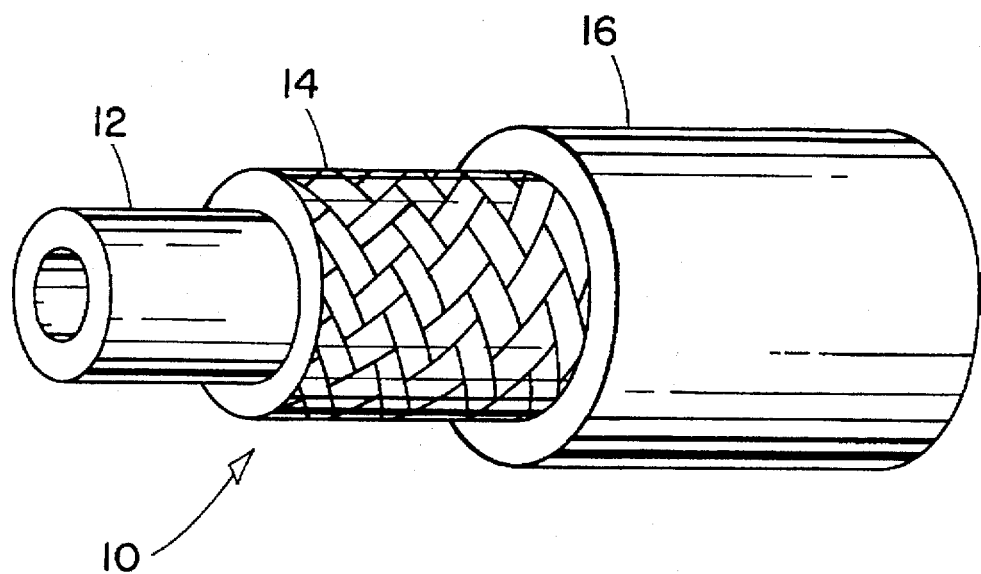
FIG. 1 is a perspective view, with parts in section, of a transmission oil cooler hose constructed in accordance with the present invention.

Referring to FIG. 1, a transmission oil cooler hose 10 constructed according to one embodiment of the present invention is shown. The hose 10 comprises an elastomeric innertube 12, a reinforcement member 14 telescoped over and preferably adhered to the inner tube 12, and an elastomeric outer cover 16 telescoped over and preferably adhered to the reinforcement member 14. The reinforcement member 14 is formed of a suitable reinforcement material which may include organic or inorganic fibers or brass-plated steel wires. The reinforcement material is preferably an organic fiber material, such as nylon, polyester, aramid, cotton or rayon. The reinforcement construction may be of any suitable type such as braid, spiral, knit or wrapped, but in the embodiment shown, is of a braid construction.

The inner tube 12 may consist of multiple elastomeric layers which may or may not be of the same composition, however in the preferred embodiment shown, the entire inner tube is made of the containing chlorine-containing polyethylene- or polyether-based elastomer composition of the present invention.

The elastomeric outer cover 16 is made of suitable materials designed to withstand the exterior environment encountered. In the preferred embodiment shown, the outer cover 16 is made of the containing chlorine-containing polyethylene- or polyether-based elastomer composition of the present invention.

Figure 2:
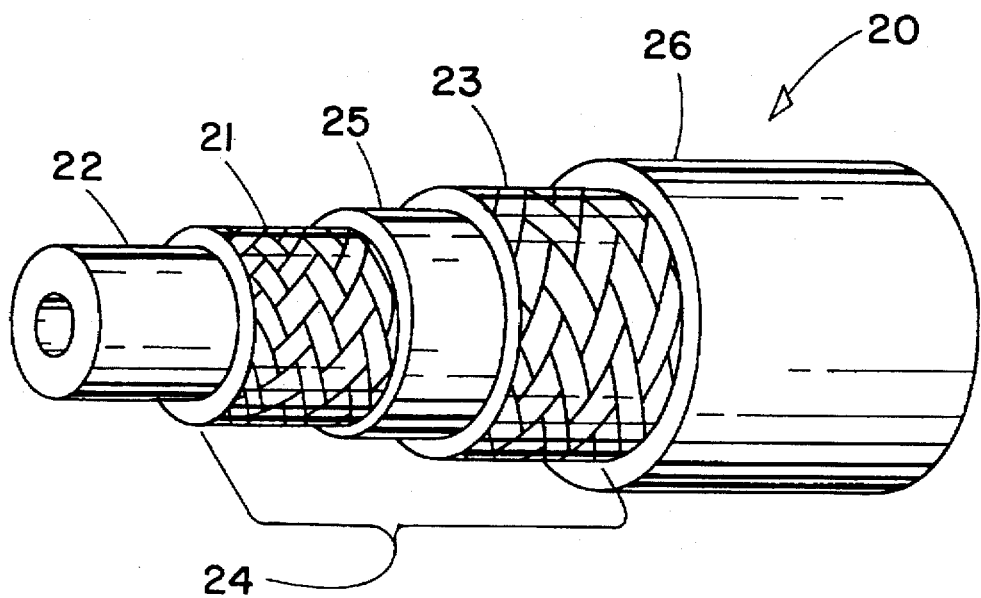
FIG. 2 is a perspective view, with parts in section, of a power steering hose constructed in accordance with the present invention.

Referring to FIG. 2, a power steering hose 20 constructed according to one embodiment of the present invention is shown. The hose 20 comprises an elastomeric inner tube 22, a reinforcement member 24 telescoped over and preferably adhered to the inner tube 22, and an elastomeric outer cover 26 telescoped over and preferably adhered to the reinforcement member 24. The reinforcement member 24 comprises one or more alternating reinforcement layers 21, 23 and one or more insulating elastomer layers 25. The reinforcement layers 21, 23 are formed of a suitable reinforcement material which may include organic fibers or brass-plated steel wires, and may be of any suitable construction and material such as those described for FIG. 1 but in the embodiment shown, are of a braid construction.

The inner tube 22 may consist of multiple elastomeric layers which may or may not be of the same composition, however in the preferred embodiment shown, the entire inner tube comprises the barium sulfate heat stabilized chlorine-containing polyethylene- or polyether-based elastomer composition of the present invention.

The elastomeric outer cover 26 and insulating elastomer layer 25 or layers are made of suitable materials designed to withstand the exterior environment encountered. In the preferred embodiment shown, the outer cover 26 and the insulating elastomer layer 25 are made of the barium sulfate heat stabilized chlorine-containing polyethylene- or polyether-based elastomer compositions of the present invention.

While the present invention is illustrated with reference to the embodiments shown, it should be understood that the present invention is not to be limited to these particular embodiments or forms as illustrated, but rather is applicable to any elastomeric construction within the scope of the claims as defined below.

The chlorine-containing polyethylene- or polyether-based elastomers useful for the present invention include but are not limited to chlorinated polyethylene elastomer, chlorosulfonated polyethylene elastomer, chlorinated ethylene/propylene elastomer, chlorinated ethylene/propylene/diene elastomer, chlorinated ethylene/1-butene rubber, chlorinated ethylene/4-methylpentene elastomer, polyepichlorohydrin elastomer, epichlorohydrin/ethylene oxide copolymer elastomer and epichlorohydrin/allyl glycidyl ether copolymers and terpolymers. In a preferred embodiment, at least one elastomeric member of a hose comprises a chlorine-containing polyethylene-based elastomer composition which has been heat stabilized with barium sulfate, and in the most preferred embodiment, at least one elastomeric member of a hose comprises chlorinated polyethylene which has been heat stabilized with barium sulfate.

Barium sulfate is commonly used as an inert filler in elastomeric compositions, comprising from about 60 to about 500 phr of such compositions. Barium sulfate used as an inert filler is especially common where non-discoloration of the final product is desired, or where high specific gravity or sound deadening is required. Barium sulfate has been used as a filler for natural rubbers, synthetic rubbers, latexes, and polyurethane foams.

The U.S. Environmental Protection Agency deleted barium sulfate from its list of toxic chemicals for which reporting is required under EPCRA, and therefore also from the chemicals listed under PPA. Among other information, PPA requires reporting of the quantity of listed chemicals entering any waste stream or otherwise released into the environment, prior to disposal.

It has now been surprisingly found that barium sulfate functions as a heat stabilizer in the curing or vulcanization of chlorine-containing polyethylene- and polyether-based elastomers, when used in amounts suitable for heat stabilization, i.e., from about 1 to about 25 phr. Chlorine-containing polyethylene- and polyether-based elastomers which have been stabilized with barium sulfate exhibit excellent physical properties, substantially equivalent in all relevant respects to such elastomers which have been stabilized with lead oxide. Heat stabilizers are generally added to chlorine-containing elastomers in amounts of from about 1 to about 30 phr. The barium sulfate used to heat stabilize the chlorine-containing polyethylene- or polyether-based elastomers in the present invention is used in amounts of from about 1 to about 25 parts per hundred weight of the elastomer (phr). It is preferably used in amounts of from about 8 to about 18 phr, and in the most preferred embodiment, barium sulfate is used in amounts of from about 10 to about 15 phr. Thus when used as a heat stabilizer for chlorine-containing polyethylene- and polyether-based elastomers, barium sulfate is used in far lesser amounts than when used as a filler for such elastomers.

The improved heat stabilized chlorine-containing polyethylene- or polyether-based elastomer composition of the present invention may contain various compounding agents known in the art such as fillers, reinforcing agents, plasticizers, softeners, antioxidants and process aids, in amounts generally known in the art. For example, fillers such as carbon black, hydrated silicates, clays and talcs may be used in amounts of from about 5 to about 250 phr; reinforcing agents such as phenolic and petroleum resins, may be used in amounts of from about 5 to about 200 phr; plasticizers such as phthalic acid derivatives and adipic acid derivatives may be used in amounts of from about 1 to about 25 phr; antioxidants may be used in amounts of from about 0.1 to about 10 phr; and cross-linking agents may be used in amounts of from about 0.1 to about 10 phr.

The chlorine-containing polyethylene- or polyether-based elastomers heat stabilized with barium sulfate useful in the present invention may be prepared by any conventional procedure such as for example, by mixing the ingredients in an internal mixer or on a mill.

The following examples are submitted for the purpose of further illustrating the nature of the present invention and are not intended as a limitation on the scope thereof. Parts and percentages referred to in the examples and throughout the specification are by weight unless otherwise indicated.

| Trade Name and Material | Supplier |
|---|---|
| TAIC - triallyl isocyanurate | Mitsubishi |
| Trigonox 17-40 - 40% n-butyl 4,4-bis(t-butyl peroxy) valerate on calcium carbonate filler | Akzo Chemicals, Inc. |
| Vul-Cup 40KE -α-α-bis(t-butyl peroxy) diisopropyl benzene on Burgess KE clay | Hercules, Inc. |

Table 1 describes formulas for several compositions made according to the present invention. Tables 2, 3, and 4 describe properties of plate samples of the compositions described in Table 1. These properties were measured according to the following test protocols: General Physical Test Requirements by ASTM Practice D3183, Tension Test by ASTM D412, Heat Aging by ASTM D572, Deterioration in Air Oven by ASTM D573, and Effect of Liquid Immersion by ASTM D471.

TABLE 1

| Material | Example 1, phr | Example 2, phr | Example 3, phr | Example 4, phr | Example 5, phr | Example 6, phr |
|---|---|---|---|---|---|---|
| Tyrin CM 0836 | 100 | 100 | 100 | 100 | 100 | 100 |
| N774 | 54 | 54 | 54 | 54 | 54 | 54 |
| Barytes | 12 | 18 | 16 | 14 | 10 | 8 |
| Hubercarb Q325 | 20 | 20 | 20 | 20 | 20 | 20 |
| Zeolex 80 | 43.25 | 43.25 | 43.25 | 43.25 | 43.25 | 43.25 |
| Plasthall TOTM | 35 | 35 | 35 | 35 | 35 | 35 |
| Plasthall DAP | 13 | 13 | 13 | 13 | 13 | 13 |
| Maglite D | 9.75 | 9.75 | 9.75 | 9.75 | 9.75 | 9.75 |
| AgeRite Resin D | 0.5 | 0.5 | 0.5 | 0.5 | 0.5 | 0.5 |
| TAIC | 2 | 2 | 2 | 2 | 2 | 2 |
| Trigonox 17-40 | 5 | 5 | 5 | 5 | 5 | 5 |
| Vul-Cup 40KE | 3.5 | 3.5 | 3.5 | 3.5 | 3.5 | 3.5 |

For the following examples:

| Trade Name and Material | Supplier |
|---|---|
| Tyrin CM 0836 - Chlorinated Polyethylene, 36% Chlorine, Mooney viscosity 100 | Dow Chemical Co. |
| Tyrin CM 0136 - Chlorinated Polyethylene, 36% Chlorine, Mooney viscosity 80 | Dow Chemical Co. |
| N774 - Carbon Black | J. M. Huber Corp. |
| Barytes - Barium Sulfate | Harcros Chemicals, Inc. |
| Akrosperse 243 - Basic silicate white lead-chlorinated polyethylene dispersion | Akrochem Co. |
| Hubercarb Q325 - Calcium Carbonate | J. M. Huber Corp. |
| Zeolex 80 - Synthetic Sodium aluminum silicate | J. M. Huber Corp. |
| Plasthall TOTM - Trioctyl trimellitate | C. P. Hall |
| Plasthall DAP - Diallyl phthalate | C. P. Hall |
| Maglite D - Magnesium Oxide | C. P. Hall |
| AgeRite Resin D - Polymerized 1,2-dihydro-2,2,4-trimethyl quinoline | R. T. Vanderbilt |

For all examples and comparative examples, compounding was accomplished in the following manner. Processing was carried out in a Banbury mixer having an inner volume of 16,500 cubic centimeters; kneading was carried out at approximately 30 rpm. The batches were processed as two-pass mixes. In the first pass, all ingredients except the Trigonox 17-40 and Vul-Cup 40KE were added to the Banbury mixer and mixed to a temperature sufficiently above ambient so as to affect dispersion, and then dropped. In the second pass one half of the mixed batch was added to the Banbury mixer, followed by the Trigonox 17-40 and the Vul-Cup 40KE, then the second half was added. The batches were remilled to about 104° C. and then dropped.

Physical tests were conducted for all molded compounds after molding and again after heat aging at 150° C. for 168 hours. Tables 3 and 4 include heat aged results for samples aged in dry air, and in Dextron IIE transmission fluid, respectively.

TABLE 2

Properties of Unaged Samples

|  | Example 1 | Example 2 | Example 3 | Example 4 | Example 5 | Example 6 |
|---|---|---|---|---|---|---|
| % Eb | 209.6 | 235.9 | 226.9 | 225.1 | 234.5 | 233.5 |
| M100(psi) | 1097 | 1103 | 1100 | 1133 | 1109 | 1120 |
| % Compression Set | 28.6 | 29.1 | 27.1 | 27.5 | 27.2 | 30.2 |
| Specific Gravity | 1.485 | 1.515 | 1.511 | 1.493 | 1.481 | 1.473 |

TABLE 3

Properties of Samples Aged in Dry Air, 168 hours at 150° C.

|  | Example 1 | Example 2 | Example 3 | Example 4 | Example 5 | Example 6 |
|---|---|---|---|---|---|---|
| Tensile at break | 2225 | 2146 | 2208 | 2200 | 2189 | 2005 |
| % Tensile retained | 116 | 106 | 111 | 108 | 106 | 96 |
| % Eb | 130.9 | 125.6 | 136.8 | 130.9 | 135.3 | 113.3 |
| % Eb retained | 62 | 53 | 60 | 58 | 58 | 49 |

The data of Tables 2 and 3 indicate that samples heat stabilized with barium sulfate exhibit good material properties when unaged as well as when aged. Data for Example 2 and Example 6 indicate that at barium sulfate levels of 8 phr and 18 phr, respectively, elongation retention values on aging begin to deteriorate. The preferred range of barium sulfate for these examples is thus between 8 and 18 phr. Optimal elongation at break is obtained at barium sulfate levels of 12 phr, as shown in Example 1.

TABLE 4

Properties of Samples Aged in Dextron IIE, 168 hours at 150° C.

|  | Example 1 | Example 2 | Example 3 | Example 4 | Example 5 | Example 6 |
|---|---|---|---|---|---|---|
| Tensile at break (psi) | 1541 | 1451 | 1638 | 1668 | 1655 | 1651 |
| % Tensile retained | 81 | 71 | 82 | 82 | 80 | 79 |
| % Eb | 98.91 | 97.55 | 105.6 | 106.3 | 103.1 | 106.1 |
| % Eb retained | 47 | 41 | 47 | 47 | 44 | 45 |
| Volume Change % | 12.9 | 12.6 | 13.0 | 12.8 | 12.6 | 12.5 |

The data in Table 4 indicate that samples heat stabilized with barium sulfate in levels of from 8 to 18 phr perform acceptably upon aging in Dextron IIE transmission fluid.

Table 5 describes formulas for two compositions which were manufactured and formed into the elastomeric components of a transmission oil cooler hose, as described in FIG. 1. Formula A represents one embodiment of the present invention. Comparative Formula B represents a substantially similar formula incorporating lead oxide as a heat stabilizer in place of barium sulfate. Tables 6, 7 and 8 describe properties of samples of the elastomeric portions of the hoses prepared and analyzed as described in ASTM D380.

TABLE 5

| Material | Formula A, phr | Comparative Formula B: phr |
|---|---|---|
| Tyrin CM 0536 | 100 | 0 |
| Tyrin CM 0136 | 0 | 100 |
| N774 | 54 | 54 |

TABLE 5-continued

Formulas

| Material | Formula A, phr | Comparative Formula B: phr |
|---|---|---|
| Barytes | 12 | 0 |
| Akrosperse 243 | 0 | 11.9 |
| Hubercarb Q325 | 20 | 20 |
| Zeolex 80 | 43.25 | 43.25 |
| Plasthall TOTM | 35 | 35 |
| Plasthall DAP | 13 | 13 |
| Maglite DE | 9.75 | 9.75 |
| AgeRite Resin D | 0.5 | 0.5 |
| TAIC | 2 | 2 |
| Trigonox 17-40 | 5 | 5 |
| Vul-Cup 40KE | 3.5 | 3.5 |

TABLE 6

Properties of Unaged Samples

| | Formula A sample | Comparative Formula B sample |
|---|---|---|
| Tensile at break (psi) | 1970 | 2134 |
| % Eb | 244 | 221 |
| M100 (psi) | 1025 | 1241 |
| M200 (psi) | 1716 | 2050 |
| Durometer | 84 | 82 |
| Compression set (cure time 60 mins, at 165° C.) | 20.3 | 20.3 |

TABLE 7

Properties of Samples Aged in Dry Air, 168 hours at 150° C.

| | Formula A sample | Comparative Formula B sample |
|---|---|---|
| Tensile at break (psi) | 2077 | 2082 |
| % Tensile retained | 105 | 98 |
| % Eb | 120.1 | 112.6 |
| % Eb retained | 49 | 51 |
| Durometer | 93 | 94 |
| Durometer change | 9 | 12 |

TABLE 8

Properties of Samples Aged in Dextron IIE 70 hours at 168° C.

| | Formula A sample | Comparative Formulation B sample |
|---|---|---|
| Tensile at break (psi) | 1635 | 1764 |
| % Tensile at break retained | 83 | 83 |
| % Eb | 129.3 | 114.7 |
| % Eb retained | 53 | 52 |
| M100 | 1239 | 1502 |
| % M100 retained | 121 | 121 |
| Durometer | 70 | 70 |
| Durometer change | −14 | −12 |
| Volume Change, % | 13.9 | 15.4 |

The data in Tables 6, 7 and 8 indicate that hose samples incorporating chlorinated polyethylene elastomer prepared with barium sulfate as the heat stabilizer perform substantially the same in all relevant respects as such samples incorporating chlorinated polyethylene elastomer prepared with lead oxide as the heat stabilizer.

The improvement of the present invention is the incorporation of barium sulfate, in amounts of from about 1 to about 25 phr, as a heat stabilizer for chlorine-containing polyethylene- and polyether-based elastomers. The invention includes an improved heat and chemical resistant hose, wherein at least one elastomeric member of the hose comprises a chlorine-containing polyethylene- or polyether-based elastomer heat stabilized with barium sulfate. In a preferred embodiment, at least one elastomeric member of the hose comprises a chlorinated polyethylene elastomer heat stabilized with barium sulfate.

Although the present invention has been described in detail in the foregoing for the purpose of illustration, it is to be understood that such detail is solely for that purpose and that variations can be made therein by one skilled in the art without departing from the spirit or scope of the present invention except as it may be limited by the claims. The invention illustratively disclosed herein may be suitably practiced in the absence of any element which is not specifically disclosed herein.

What is claimed is:

1. A high temperature and chemical resistant elastomeric composition for incorporation in an article subject to high temperature or chemical exposure, comprising:
   a) 100 parts of a chlorine-containing elastomer selected from the group consisting of;
      i) chlorine-containing polyethylene-based elastomers, and
      ii) chlorine-containing polyether-based elastomers; and
   b) from about 1 to about 25 parts per hundred weight of said elastomer, of barium sulfate which serves as the heat stabilizer of said chlorine-containing elastomer,
   said composition being substantially free of heat stabilizers containing lead, said composition exhibiting high temperature and chemical resistance properties substantially equivalent or superior to a lead oxide-heat stabilized elastomeric composition.

2. An article subject to high temperature or chemical exposure incorporating the composition of claim 1.

3. A high temperature and chemical resistant hose, comprising an inner tube portion, a reinforcement layer telescoped about said inner tube portion, and an outer tube portion, wherein at least one of said inner tube portion or outer tube portion is prepared from an elastomeric composition exhibiting high temperature and chemical resistance properties substantially equivalent or superior to a lead oxide-heat stabilized elastomeric composition, said elastomeric composition comprising:
   a) 100 parts of a chlorine-containing elastomer selected from the group consisting of;
      i) chlorine-containing polyethylene-based elastomers, and
      ii) chlorine-containing polyether-based elastomers; and
   b) from about 1 to about 25 parts per hundred weight of said elastomer, of barium sulfate which serves as the heat stabilizer of said chlorine-containing elastomer,
   said composition being substantially free of heat stabilizers containing lead.

4. The hose of claim 3, wherein said chlorine-containing polyethylene-based elastomers are chosen from the group consisting of chlorinated polyethylene elastomer, chlorosulfonated polyethylene elastomer, chlorinated ethylene/propylene elastomer, chlorinated ethylene/propylene/diene elastomer, chlorinated ethylene/1-butene elastomer, and chlorinated ethylene/4-methylpentene elastomer.

5. The hose of claim 3 wherein said chlorine-containing polyether-based elastomers are chosen from the group consisting of polyepichlorohydrin elastomer, epichlorohydrin/ ethylene oxide copolymer elastomer and epichlorohydrin/ allyl glycidyl ether copolymer and terpolymer elastomers.

6. The hose of claim 3 wherein said chlorine-containing elastomer is chlorinated polyethylene elastomer.

7. The hose of claim 3 wherein said barium sulfate is present in an amount of from about 8 to about 18 parts per hundred weight of said elastomer.

8. The hose of claim 3 wherein said barium sulfate is present in an amount of from about 10 to about 15 parts per hundred weight of said elastomer.

9. The hose of claim 3 wherein said hose is in the form of a transmission oil cooler hose.

10. The improved hose of claim 3 wherein said hose is in the form of a power steering hose.

11. A high temperature and chemical resistant hose, comprising an inner tube portion, a reinforcement layer telescoped about said inner tube portion, and an outer tube portion, wherein at least one of said inner tube portion or outer tube portion is prepared from an elastomeric composition exhibiting high temperature and chemical resistance properties substantially equivalent or superior to a lead oxide-heat stabilized elastomeric composition, said elastomeric composition comprising:

a) 100 parts of chlorinated polyethylene elastomer; and b) from about 10 to about 15 parts per hundred weight of said elastomer, of barium sulfate, which serves as the heat stabilizer of said chlorinated polyethylene elastomer, said composition being substantially free of heat stabilizers containing lead.

12. A method of heat stabilizing a chlorine-containing polyethylene- or polyether-based elastomeric composition in the substantial absence of heat stabilizers containing lead comprising the steps of:

a) adding from about 1 to about 25 parts per hundred weight of said elastomer of barium sulfate to 100 parts of said elastomer to form a mixture; and, b) curing said mixture.

13. The composition of claim 1 further including magnesium oxide.

14. The hose of claim 3 further including magnesium oxide.

* * * * *